United States Patent

Neuhaus et al.

[15] 3,702,993

[45] Nov. 14, 1972

[54] STORAGE DEVICE

[72] Inventors: Hans Wilhelm Neuhaus, Harkssheide; Jan Verweel, Hamburg, both of Germany

[73] Assignee: U.S. Philips Corporation, New York, N.Y.

[22] Filed: Dec. 9, 1970

[21] Appl. No.: 96,300

[30] Foreign Application Priority Data

Dec. 10, 1969 Germany..........P 19 61 887.2

[52] U.S. Cl..340/174 YC, 340/174 TF, 340/174 PW

[51] Int. Cl. ..........................................G11c 11/14

[58] Field of Search...340/174 YC, 174 PW, 174 PC, 340/174 TF, 173 LM

[56] References Cited

UNITED STATES PATENTS

| | | | |
|---|---|---|---|
| 3,164,816 | 1/1965 | Chang et al. | .........340/174 YC |
| 3,482,225 | 12/1969 | Schweizerhof et al | .........340/174 PC |
| 3,421,154 | 1/1969 | Bowers et al | ........340/174 YC |
| 3,042,912 | 7/1962 | Gilbert | ................340/173 LM |

OTHER PUBLICATIONS

IEEE Transactions on Magnetics, " A New Direct Measurement of the Domain Wall Energy of the Orthoferrites" by Kurtzig et al., Vol Mag 4; No. 3; 9/68; p. 426– 430.

Journal of Applied Physics, Thin Film Applications, " Laser–Beam Recording on a Magnetic film" by Treves et al; vol 40; No. 3; 3/69; pages 972,973.

*Primary Examiner*—Stanley M. Urynowicz, Jr.
*Attorney*—Frank R. Trifari

[57] ABSTRACT

In stores using a thin magnetic film the coercivity of which is highly temperature-dependent, in order to write an information an area is heated by an electron beam or a laser beam to a temperature such (for example, a temperature above the Curie-temperature) as to enable the magnetisation in the relavant area to be adjusted to an externally generated magnetic field. This magnetic field is not generated in known manner by a coil at the edge of the store, but by a printed wire which traces a tortuous path between the discrete areas. Owing to the small distance between the printed wire and each storage area a smaller magnetic field is required and the inductance of this printed wire is lower than that of a coil arranged at the edge, permitting the magnetic field to be switched considerably more readily and rapidly for writing. The use of a beam splitter permits the production of a word-organized store of large capacity.

10 Claims, 6 Drawing Figures

Figure 1:
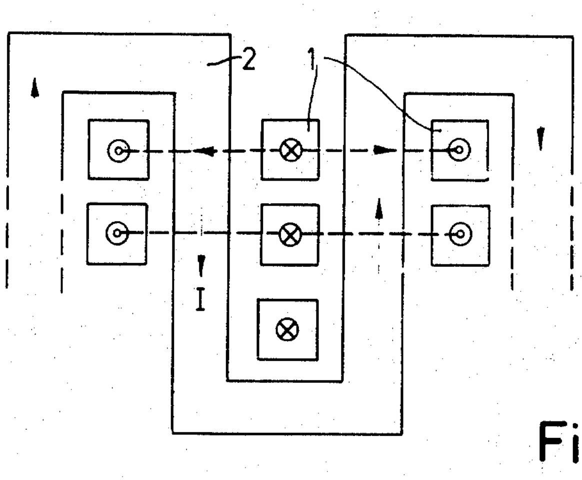

INVENTORS
HANS W. NEUHAUS
BY JAN VERWEEL
AGENT

INVENTORS
HANS W. NEUHAUS
JAN VERWEEL
BY
Frank R. Trifari
AGENT

STORAGE DEVICE

The invention relates to a storage device for storing binary coded data in the form of magnetic states in a magnetizable material the coercivity of which is greatly varied in a given comparatively small temperature range. The material, which is deposited as a thin film on a substrate, is maintained at a temperature below the said temperature range. In order to store binary coded information only a single area of the film is heated by a positionable beam of energy to a temperature above the said temperature range, so that the magnetization of the irradiated area is adjusted in the direction of an external magnetic field, which direction is controlled by the binary coded information.

Such storage devices are known. In at least one of the known devices the beam of energy takes the form of an electron beam in a cathode ray tube, which beam is arranged to be positioned on to any location of the screen by voltages applied to the deflection plates. The thin film of magnetizable material is deposited on the inner side of the screen or on a special substrate placed in front of the screen. The external magnetic field controlled by the information is produced by a coil disposed externally of the tube. Since the coil has a large surface area, it has a high inductance, and because in addition a large current is necessary to produce a magnetic field of sufficient strength to change the direction of magnetization of a seleted area, driving the coil and switching the large current at the required speed provide difficulty. Hence, first the respective area or a whole row or column of areas is erased, for which purpose the current in the coil need not be switched, after which, with the application of an opposed field or, in the case of magnetic films having a preferred direction, without the application of a field, the energy beam is positioned or unblanked only on to the areas in which a "1" is to be written. However, immediate high-speed re-writing of the information of an area is not possible.

In other known storage devices, the energy beam is a laser beam which is positioned by mirrors or by a digital light deflection system. However, in these systems also the production of the magnetic field provides difficulty so that in these devices also an erase operation has to precede the modulation of the writing laser beam with the information in order to avoid the need for rapid switching of the current in the coil.

The present invention provides a method of directly and rapidly re-writing the information in a discrete area, and it is characterized in that for the production of the magnetic field a printed wire is deposited between the areas so as to trace a tortuous path.

As a result of this tortuous path of the printed wire the distribution of the magnetic field in the storage film will be considerably more uniform so that a smaller current will be sufficient. Moreover, the inductance of the printed wire is lower in this arrangement, permitting the current in the wire to be rapidly switched. This enables rapid and direct writing, since the current is directly modulated by the information and the energy beam has only to select the addresses.

Figure 2A:
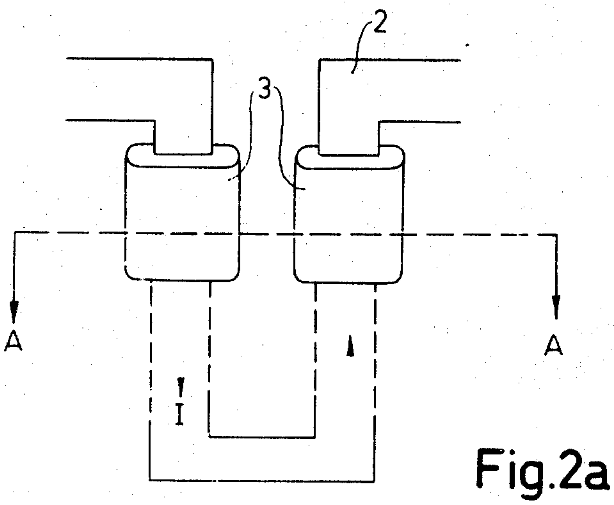
Figure 2B:
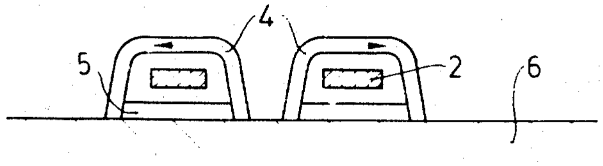
Figures 3A, 3B:
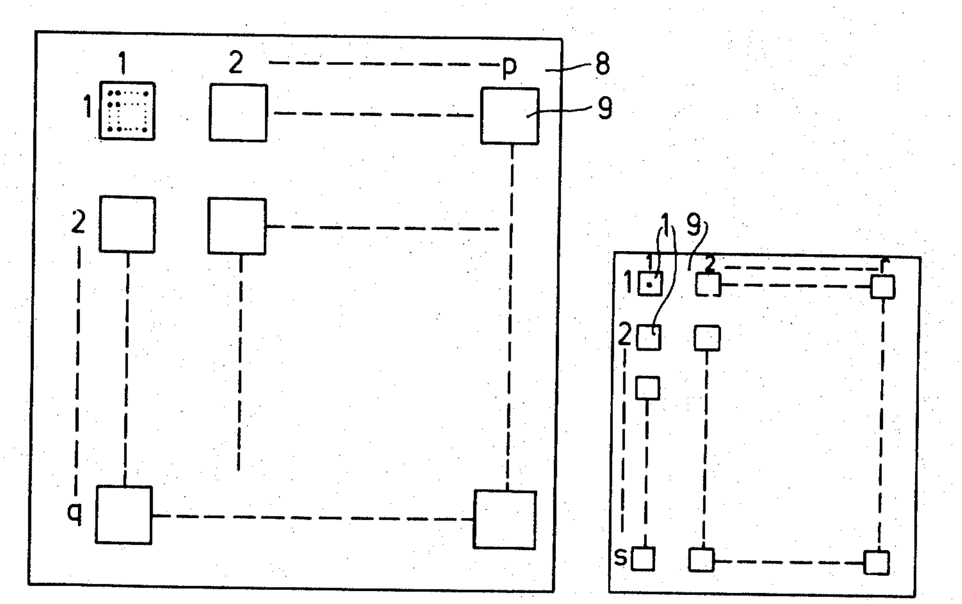
Figure 4:
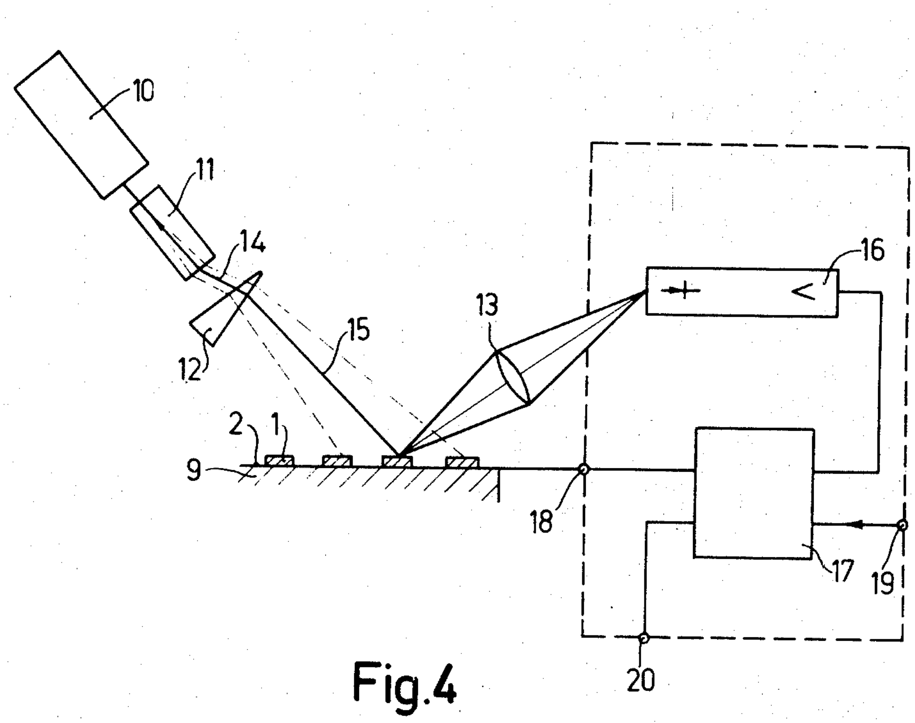

Embodiments of the invention will now be described, by way of example, with reference to the accompanying diagrammtic drawings, in which FIG. 1 shows the tortuous path of the printed wire between the discrete areas, FIG. 2*a* shows magnetic areas which enclose the printed wire, FIG. 2*b* is a cross sectional view of two such areas, FIG. 3*a* is a storage plane for a word-organized store, FIG. 3*b* shows the structure of a bit plane of such a store, and FIG. 4 shows schematically the operation of the store by means of a laser beam and the scanning of the stored information.

Referring now to FIG. 1, for simplicity only a few areas are shown between which a printed wire 2 has been deposited so as to trace a tortuous path, for in this embodiment the areas 1 are mutually spaced. Although this is not absolutely necessary, it has the advantage of reducing the influence of the individual areas 1 on one another and the inductance of the printed wire 2. A current I in the printed wire 2 will generate in each area a magnetic field at right angles to the surface, the direction of the fields in each column of areas being opposite to that in the adjacent column or columns. This alternation must be taken into account when writing or reading, but this may readily be effected by means of the addresses in the horizontal coordinate axis. Reading may be performed, for example, by utilizing the Faraday effect, the selected areas being irradiated by a polarized laser beam and the rotation of the plane of polarization of the transmitted light being evaluated. Such a store construction requires magnetic material having either a high magnetic anisotropy or a low magnetization such, for example, as MnBi, $Gd_3Fe_50_{12}$, A1-ferroxdure and $YFe0_3$.

FIG. 2 shows another embodiment in which the areas are shaped in the form of storage elements 3 which enclose the printed wire 2, with consequent closure of the magnetic flux. In order to show the construction in greater detail FIG. 2*b* is a cross-sectional view of two such adjacent storage elements. A substrate 6 is coated with a magnetically active layer 5 at the location of each storage element 3. Alternatively, the substrate 6 may be coated with such a layer throughout its surface or it may consist of a magnetically active material.

The printed wire 2 is so deposited on the said lower layer as to follow a tortuous path in top plan view. Alternatively, the printed wire may be deposited on the lower layer in an insulated manner and may itself be coated with a further insulating layer of, for example, $Si0_2$, especially when the material of the lower layer 5 and that of the coating layer 4 have a small resistivity. Finally, the coating layer 4 is applied so as to be in satisfactory contact with the lower layer 5 on both sides of the printed wire 2. The latter coating layer 4 only has to consist of a material the coercivity of which may greatly be changed in a narrow temperature range. However, owing to the closed magnetic circuit the material may be comparatively soft magnetic having a comparatively large magnetization, for example, silicon-iron. The lower layer 5 or the substrate 6 may consist of any suitable soft magnetic material to serve as a magnetic shunt.

Non-destructive reading by means of the Faraday effect is not advantageous in this embodiment, because the radiation will be completely absorbed by the various layers, especially by the printed wire, whilst the edge layer at the sides of the printed wire 2 is too narrow. In addition, the coating layer 4 is not magnetized at right angles to the surface, but parallel thereto, as is indicated by arrows in FIG. 2*b*, the direction of the magnetization being opposed in adjacent columns at a given current direction. However, in this embodiment reading may be effected by using the magneto-optical Kerr effect, according to which the plane of polarization of a polarized light-beam is rotated on reflection at a magnetized surface. However, many materials cannot readily be deposited so as to have a sufficiently smooth surface. In this case the store may be scanned from the rear, since the lower layer has been deposited on the highly smooth surface of the substrate 6 and hence automatically will be highly smooth itself.

A single detector will be sufficient to evaluate the optical signals from all the areas, i.e., for converting them into electrical signals, since only one area at the time will be irradiated. The same holds for reading by means of the Faraday effect.

One way of increasing the capacity of such store is to use more discrete areas. However, this will increase the overall length of the tortuous printed wire to an extent such as to give rise to difficulty in driving the wire. In this case, the printed wire may be subdivided into two or more sections, which may be separately driven. Another possibility is to divide the areas in groups 9 of equal size in the manner shown in FIG. 3*b*. Each group 9 will comprise an array of areas 1 as shown in FIG. 3*a*. Such a storage plane 8 is operated by means of a selection arrangement as shown in FIG. 4. In this arrangement a beam of energy 14, in this case from a laser 10, after its passage through control means 11, for example a digital light deflector, is directed through a beam splitter 12 which divides the energy beam 14 into several preferably parallel output beams 15 of about equal intensities. The spacings between the divided output beams 15 are equal to the spacings between the groups 9 (1, 1 to *p*,*q*) of areas, so that with a given deflection the output beams impinge on the same area, for example the left-hand column upper row area, in all the groups 9. Thus, the number of areas of which are simultaneously written or read is equal to the number of groups and hence each group is connected by a separate printed wire to driving or selecting means and has a separate detector. FIG. 4 shows the necessary electrical or optical means for a group 9. As has been mentioned hereinbefore, the energy beam source 10 is assumed to be a laser which emits a focussed light beam into a digital light deflector 11. The electrical signals produced from a given address are applied to this deflector so that the light beam 14 emerging from it is directed on to the area 1 associated with the address. However, the light beam 14 previously passes through a beam splitter 12 by which it is divided so that the individual sub-beams 15, only one of which is shown, are directed onto the same area in each group. In order to write an item of information in the store the laser beam is switched to high energy, and from an output 18 a current produced from information supplied to an information register 17 at an input 19 is passed through the printed wire 2. In order to read a storage location the laser beam, now switched to low energy in order not to destroy the stored information, is polarized and the reflected light is collected by means of a lens 13 and directed through an analyzer, not shown, on to a photoelectric amplifier 16, the output signal of which is also applied to the information register 17. The information read may be re-written in the same group 9 at another location, i.e., a bit may be shifted in the store, but this information may also be derived from an output 20. The desired area may be obtained by electric selection of the printed wire or of the photo-electric amplifier of the group concerned. Thus, a desired item of information may rapidly and simply be selected from a large number of items of information.

The described structure of the storage plane 8 illustrated in FIG. 3*b* may also be advantageously used as a word-organized store. In this case, the storage plane preferably contains a number of groups 9 which is equal to the number of bits contained in a word or is an integral multiple thereof. Thus, in the storage plane 8 shown in FIG. 3*b* words each consisting of $m = p \times q$ bits may be stored. If the individual groups 9 have the structure shown in FIG. 3*a* and one bit is stored in each area 1, the store 8 is capable of storing $r \times s = n$ words. For each group 9 the store will include an assembly as shown in FIG. 4 comprising a collector lens 13 and an electronic control device having a photo-electric amplifier 16 and an information register 17 including a current generator for supplying the current through the printed wire 2 in accordance with each bit of the word.

In all these systems it is assumed that the control means are capable of accurately positioning the beam of energy on to each storage element. In the case of small inaccuracies in the deflection means, which may consist of a digital light deflector, and in word-organized stores in the case of inaccuracies in the beam splitter the beam of energy will accurately impinge on the storage elements in only a few parts of the store but in other parts it will fall between the storage elements or it will even impinge on wrong elements. Further, the storage elements must be disposed on the substrate with a high degree of accuracy to prevent the cumulation of tolerances. Hence, complicated and expensive control means or, for example in the case of laser beams, optical correction means are required. These difficulties may be avoided by using the energy beam together with the deflection means and, as the case may be, the beam splitter in the manufacture of the storage plane, for example, by means of a sequence of coating operations and photolithographic methods. This ensures that the energy beam will automatically impinge correctly on all the storage elements if it has been accurately positioned on to one storage element or two diagonally opposed storage elements. This permits the use of control means and beam splitters which exhibit comparatively great inaccuracies and are proportionally cheaper.

What is claimed is:

1. A storage device for storing binary information in the form of magnetic states comprising a magnetizable material having a coercivity which is variable over a large range within a comparatively small temperature range, said material deposited on a substrate in the form of a plurality of separately spared areas of a thin film, said areas being maintained at a temperature below the said temperature range, means for selectively storing binary-coded information in any single area of said film by heating said area with a controllable beam of energy to a temperature above the said temperature range whereby the magnetization of said heated area is adjusted in the direction of an externally applied magnetic field, said direction being controlled by the binary-coded information, and a printed wire deposited so as to trace a tortuous path between said areas for providing said magnetic field.

2. A storage device as claimed in claim 1, wherein said printed wire is divided into several parts.

3. A storage device as claimed in claim 1, wherein each of said areas are divided into several groups, each including the same number of equally arranged areas, an energy beam arranged to pass through a control means, a beam splitter, said beam splitter dividing said controlled energy beam into a number of energy sub-beams of about equal intensities, which number is equal to the number of said groups, the emergent energy sub-beams being spaced from one another by constant distances which correspond to the distances between said groups at various points of impact of the incident energy beam.

4. A storage device as claimed in claim 3, wherein a given bit of an information word is stored in the same area of each group.

5. A storage device as claimed in claim 1 wherein said energy beam is a laser beam.

6. A storage device as claimed in claim 6, wherein said laser beam is controlled by a digital light deflector.

7. A storage device as claimed in claim 1 further including a positionable beam of polarized electromagnetic waves of lower intensity for reading or writing information, said information being contained in the rotation of the plane of polarization of the transmitted or reflected beam.

8. A storage device as claimed in claim 7, wherein one optical detector is provided for all the discrete areas.

9. A storage device for storing binary information in the form of magnetic states comprising a magnetizable material forming storage elements having a coercivity which is variable over a large range within a comparatively small temperature range, said material deposited on a substrate, said elements being maintained at a temperature below the said temperature range, means for selectively storing binary-coded information in any single element by heating said area with a controllable beam of energy to a temperature above the said temperature range whereby the magnetization of said heated element is adjusted in the direction of an externally applied magnetic field, said direction being controlled by the binary-coded information, and a printed wire tracing a tortuous path, portions of which are enclosed within said storage elements for providing said magnetic field.

10. A storage device as claimed in claim 9, wherein said substrate, at least in the proximity of said storage elements, consist of a soft magnetic material forming part of said enclosure.

* * * * *

PO-1050
(5/69)

UNITED STATES PATENT OFFICE
CERTIFICATE OF CORRECTION

Patent No. 3,702,993 Dated November 14, 1972

Inventor(s) Wilhelm Hans Neuhaus and Jan Verweel

It is certified that error appears in the above-identified patent and that said Letters Patent are hereby corrected as shown below:

Column 3, line 37, (1,1 to p,q) should be ("1,1" to "p,q")

Claim 6, line 1, "in claim 6" should be --in claim 5--.

Signed and sealed this 29th day of May 1973.

(SEAL)
Attest;

EDWARD M.FLETCHER,JR.
Attesting Officer

ROBERT GOTTSCHALK
Commissioner of Patents